United States Patent
Lin et al.

(10) Patent No.: US 10,775,668 B2
(45) Date of Patent: Sep. 15, 2020

(54) BACKLIGHT MODULE, DISPLAY PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventors: Zijin Lin, Beijing (CN); Xiaoguang Pei, Beijing (CN); Haisheng Zhao, Beijing (CN); Dongjiang Sun, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 372 days.

(21) Appl. No.: 15/554,761

(22) PCT Filed: Jan. 22, 2017

(86) PCT No.: PCT/CN2017/072088
§ 371 (c)(1),
(2) Date: Aug. 31, 2017

(87) PCT Pub. No.: WO2017/177742
PCT Pub. Date: Oct. 19, 2017

(65) Prior Publication Data
US 2018/0164641 A1    Jun. 14, 2018

(30) Foreign Application Priority Data
Apr. 13, 2016 (CN) .................... 2016 2 0307448 U

(51) Int. Cl.
*G02F 1/13357* (2006.01)
*G02F 1/1362* (2006.01)
(Continued)

(52) U.S. Cl.
CPC ...... *G02F 1/133608* (2013.01); *G02F 1/1336* (2013.01); *G02F 1/136204* (2013.01);
(Continued)

(58) Field of Classification Search
CPC ............ G02F 1/133608; G02F 1/1336; G02F 1/136204; G02F 2001/133334; G02F 2001/133612; H05F 3/02
(Continued)

(56) References Cited

U.S. PATENT DOCUMENTS

2013/0083275 A1    4/2013    Ai et al.
2014/0125903 A1    5/2014    Kim
(Continued)

FOREIGN PATENT DOCUMENTS

CN        1683958 A       10/2005
CN      201037883 Y        3/2008
(Continued)

OTHER PUBLICATIONS

Apr. 20, 2017—(WO) International Search Report and Written Opinion Appn PCT/CN20171072088 with English Tran.
(Continued)

*Primary Examiner* — Cara E Rakowski
*Assistant Examiner* — Jessica M Apenteng
(74) *Attorney, Agent, or Firm* — Banner & Witcoff, Ltd.

(57) ABSTRACT

Disclosed are a backlight module, a display panel, and a display device. The backlight module includes a module frame and at least one first conductive tip structure disposed inside the module frame, the first conductive tip structure includes a first conductive tip, the first conductive tip being in an exposed state of being exposed out from the module frame. The backlight module, according to a point discharge principle, preferentially performs discharging on static elec-
(Continued)

tricity through the conductive tip structure, to provide a novel antistatic backlight module.

19 Claims, 5 Drawing Sheets

(51) Int. Cl.
 *H05F 3/02* (2006.01)
 *G02F 1/1333* (2006.01)
(52) U.S. Cl.
 CPC ... *H05F 3/02* (2013.01); *G02F 2001/133334* (2013.01); *G02F 2001/133612* (2013.01); *G02F 2202/22* (2013.01)
(58) Field of Classification Search
 USPC .......................................................... 362/97.1
 See application file for complete search history.

(56) References Cited

U.S. PATENT DOCUMENTS

2014/0133174 A1   5/2014   Franklin et al.
2017/0131580 A1*  5/2017   Song ..................... G02F 1/1333

FOREIGN PATENT DOCUMENTS

| CN | 204631409 U | 9/2015 |
| CN | 205507311 U | 8/2016 |
| DE | 19703427 A1 | 8/1998 |
| EP | 2793073 A1 | 10/2014 |
| JP | 2008090111 A | 4/2008 |

OTHER PUBLICATIONS

Sep. 5, 2019—(EP) Extended European Search Report Appn 17754592.8.

* cited by examiner

BACKLIGHT MODULE, DISPLAY PANEL AND DISPLAY DEVICE

The application is a U.S. National Phase Entry of International Application No. PCT/CN2017/072088 filed on Jan. 22, 2017, designating the United States of America and claiming priority to Chinese Patent Application No, 201620307448.2 filed on Apr. 13, 2016. The present application claims priority to and the benefit of the above-identified applications and the above-identified applications are incorporated by reference herein in their entirety.

TECHNICAL FIELD

Embodiments of the present disclosure relate to a backlight module, a display panel, and a display device.

BACKGROUND

A backlight module is one of key components in a liquid crystal display panel. In general, the backlight module comprises a light source, a backplane, a module frame disposed on the backplane and surrounding the periphery of the backplane, as well as a reflecting sheet, a light guide plate, an optical diaphragm, etc. disposed on the backplane, and on an inner side of the module frame. The inner side of the module frame of the backlight module may be disposed with a liquid crystal cell composed of an array substrate, an opposed substrate, and a liquid crystal layer sandwiched between the array substrate and the opposed substrate. Thus, the backlight module can provide backlight with sufficient brightness and uniform distribution for the liquid crystal cell.

In a production process of the array substrate, after a thin film transistor (TFT) array is fabricated, a test line will be formed on the array substrate, for detecting various types of incidence of defects of the thin film transistor array. Since the test line is specifically used for testing the thin film transistor array, in a subsequent cutting process, a portion of the test line designed outside a cutting line will be cut off, and a portion within the cutting line will be reserved. Thus, a fracture of the cut test line will be formed at an edge of the array substrate.

Since the fracture of the cut test line is in an exposed state, it is impossible to completely seal and insulate, static electricity may enter into an internal circuit of the array substrate from the cut test line, resulting in occurrence of electro-static discharge (ESD), which destroys the internal circuit of the array substrate, and further leads to abnormal display.

SUMMARY

Embodiments of the present disclosure provide a backlight module, a display panel, and a display device. According to the principle of point discharge, the backlight module disposes a conductive tip structure inside a module frame, and disposes the conductive tip of the conductive tip structure in an exposed state which is exposed out from the module frame: such that the conductive tip structure can preferentially perform discharging on static electricity, so as to avoid the static electricity from entering into the internal circuit of the array substrate through the cut test line, so as to provide a new antistatic backlight module.

At least one embodiment of the present disclosure provides a backlight module, which comprises a module frame; and at least one first conductive tip structure, disposed inside the module frame, the first conductive tip structure including a first conductive tip, the first conductive tip being in an exposed state of being exposed out from the module frame.

For example, in the backlight module disposed by an embodiment of the present disclosure, the module frame is a polygonal frame, and the first conductive tip structure is disposed at a corner of the module frame.

For example, in the backlight module disposed by an embodiment of the present disclosure, the first conductive tip and a surface of the module frame close to the first conductive tip are located on a same plane.

For example, in the backlight module disposed by an embodiment of the present disclosure, the first conductive tip of the first conductive tip structure is disposed oriented to the light emitting surface.

For example, in the backlight module disposed by an embodiment of the present disclosure, the backlight module further comprises a first lead, the first lead being disposed inside the module frame and connected with the first conductive tip structure.

For example, in the backlight module disposed by an embodiment of the present disclosure, the first lead is grounded.

For example, in the backlight module disposed by an embodiment of the present disclosure, the first lead is partially exposed out from the module frame.

For example, in the backlight module disposed by an embodiment of the present disclosure, the first lead is a closed lead.

For example, in the backlight module disposed by an embodiment of the present disclosure, the first lead is connected with a capacitor.

For example, in the backlight module disposed by an embodiment of the present disclosure, the capacitor includes a first electrode and a second electrode, one end of the first lead is connected with the first electrode, and the other end thereof is connected with the second electrode.

For example, in the backlight module disposed by an embodiment of the present disclosure, the backlight module further comprises a second conductive tip structure, the second conductive tip structure being disposed in a position inside the module frame close to the first conductive tip structure, the second conductive tip structure including a second conductive tip, the second conductive tip being in an exposed state of being exposed out from the module frame.

For example, in the backlight module disposed by an embodiment of the present disclosure, the second conductive tip of the second conductive tip structure is disposed oriented to an inner side of the module frame.

For example, in the backlight module disposed by an embodiment of the present disclosure, the second conductive tip and a surface of the module frame close to the second conductive tip are located on a same plane.

For example, in the backlight module disposed by an embodiment of the present disclosure, the backlight module further comprises a second lead, the second lead being disposed inside the module frame and connected with the second conductive tip structure.

For example, in the backlight module disposed by an embodiment of the present disclosure, the backlight module further comprises a first lead, the first lead being disposed inside the module frame and connected with the first conductive tip structure, and the first lead and the second lead belonging to a same lead.

At least one embodiment of the present disclosure provides a display panel, comprising any one of the abovementioned backlight module.

For example, in the display panel disposed by an embodiment of the present disclosure, the display panel further comprises an array substrate, the array substrate including a conductive line and being disposed on an inner side of the module frame, the conductive line having a fracture at an edge of the array substrate, and the first conductive tip structure being disposed in a position inside the nodule frame and close to the fracture of the conductive line.

For example, in the display panel disposed by an embodiment of the present disclosure, the backlight module further comprises a second conductive tip structure, the second conductive tip structure being disposed in a position inside the module frame and close to the first conductive tip structure, the second conductive tip structure including a second conductive tip, the second conductive tip being in an exposed state of being exposed out from the module frame.

For example, in the display panel disposed by an embodiment of the present disclosure, the second conductive tip is disposed oriented to the fracture of the conductive line.

For example, in the display panel disposed by an embodiment of the present disclosure, the second conductive tip and a surface of the module frame close to the second conductive tip are located on a same plane.

For example, in the display panel disposed by an embodiment of the present disclosure, the conductive line includes a cut test line.

At least one embodiment of the present disclosure provides a display device, comprising any one of the above-mentioned display device.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention, not limitative to the present disclosure.

REFERENCE SIGNS

100—backlight module; 110—module frame; 120—first conductive tip structure; 125—first conductive tip; 130—first lead; 140—second conductive tip structure; 145—second conductive tip; 150—light emitting surface; 160—second lead; 190—capacitor; 191—first electrode; 192—second electrode; 200—display panel; 210—array substrate; 214—test line; 215—conductive line/cut test line; 2150—fracture of conductive line/cut test line; 216—test line corner portion; 2160—fracture of test line corner portion; 230—flexible printed circuit board; 240—electro-static gun.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present invention belongs. The terms "first," "second," and so on which are used in the description and the claims of the present application for invention, are not intended to indicate any sequence, amount or importance, but distinguish various components. The terms "includes," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Figure 1A:
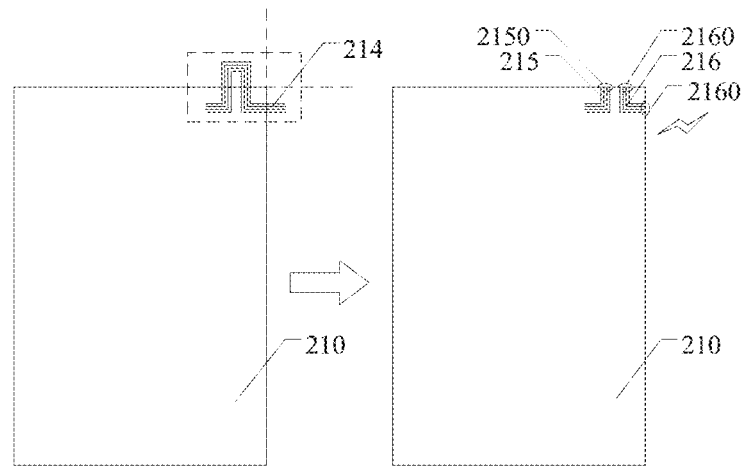
FIG. 1a to FIG. 1b are schematic diagrams of a method for avoiding electro-static discharge of a cut test line of an array substrate.

In order to solve a problem of electro-static discharge of a cut test line of an array substrate, a corner design may be used in a test line to avoid static electricity from entering into the test line. Hereinafter, it is illustrated with a case where the test line is disposed on an upper right corner of the array substrate as an example. Of course, the test line may also be disposed in other positions on the array substrate. For example, the test line may be disposed at an upper left corner of the array substrate, or simultaneously at the upper left corner and the upper right corner of the array substrate, which will not be limited here in the present disclosure. As shown in FIG. 1a, a test line 214 is disposed at an upper right corner of an array substrate 210, and the test line 214 may use a corner design shown by a rectangular dashed box in FIG. 1; after a cutting process, a cut test line 215 and an "L"-shaped test line corner portion 216 are reserved at the upper right corner of the array substrate 210. The test line corner portion 216 has two fractures 2160 and the two fractures 2160 are closer to a right-side edge of the array substrate 210 than the fracture 2150 of the cut test line 215, so that they can preferentially attract the static electricity close to the array substrate 210, so that it is possible to avoid the static electricity from entering into the array substrate 210 from the fracture 2150 of the cut test line 215.

Figure 1B:
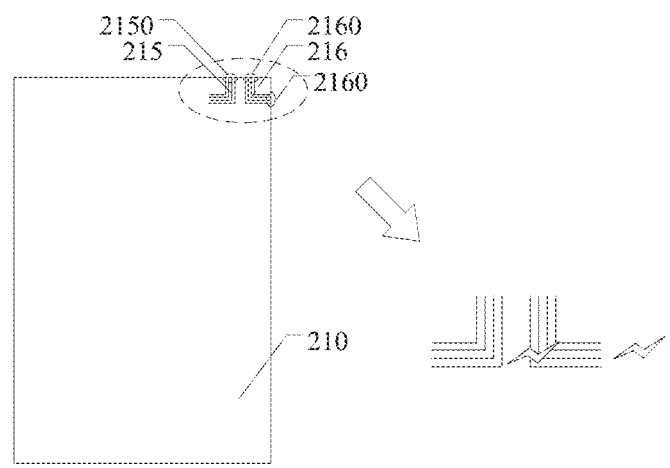
Figure 2:
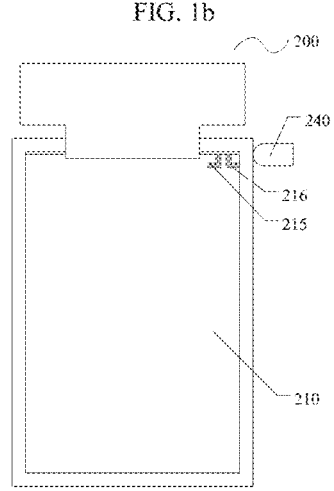
FIG. 2 is a schematic diagram of testing an antistatic performance of a display panel with an electro-static gun.

However, inventors of the present application believed in research that, as an internal circuit of the array substrate becomes more and more complicated, and due to constant pursuit of people for a narrow frame of a display panel, as well as performances such as lightness and thinness, there is less and less space left for the test line in the array substrate. In this way, the fracture of the cut test line and the right-side edge of the array substrate are closer and closer, and it is impossible for the test line corner portion to play a role in avoiding the static electricity from entering into the cut test line. In addition, as shown in FIG. 1b, even if the test line corner portion 216 attracts a charge, since a distance between the cut test line 215 and the test line corner portion 216 is getting smaller and smaller, the charge may enter into the cut test line 215 from a sharp portion of the test line corner portion 216, for example, a corner of the test line corner portion 216, so as to enter into the internal circuit of the array substrate 210. Further, the inventors of the present application also notice that, after a backlight module and a liquid crystal cell are combined to form the display panel, generally an electro-static gun will be used for discharging in a designated region of the display panel, to test an antistatic performance of the display panel. For example, as shown in FIG. 2, an electro-static gun 240 performs discharging at the upper right corner of the display panel 200, so that the charge released by the electro-static gun 240 can enter into the cut test line 215 from the upper right corner of the display panel 200, which thereby damages the internal circuit of the array substrate 210.

Embodiments of the present disclosure provide a backlight module, a display panel, and a display device. The backlight module includes a module frame and at least one first conductive tip structure disposed inside the module frame; the first conductive tip structure includes a first conductive tip, the first conductive tip being in an exposed state of being exposed out from the module frame. The backlight module, according to a point discharge principle, through a design of a conductive tip structure, preferentially performs discharging on static electricity or a charge released by an electro-static gun, to avoid the static electricity or the charge released by the electro-static gun from entering into the internal circuit of the array substrate through the cut test line.

Hereinafter, the backlight module, the display panel, and the display device provided by the embodiments of the present disclosure will be illustrated in conjunction with the accompanying drawings.

First Embodiment

Figure 3:
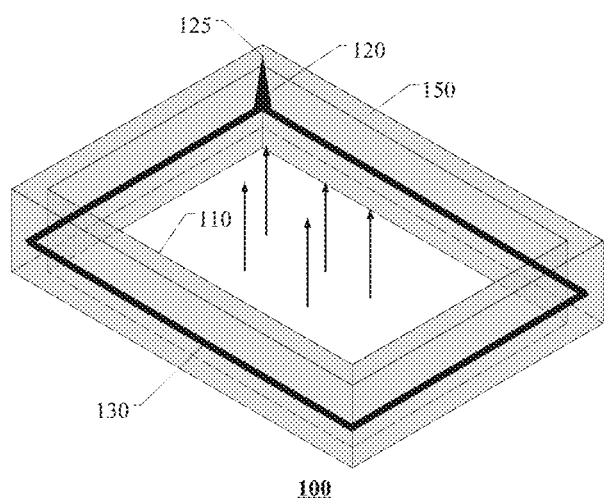
FIG. 3 is a tridimensional schematic diagram of a backlight module provided by an embodiment of the present disclosure.
Figure 4:
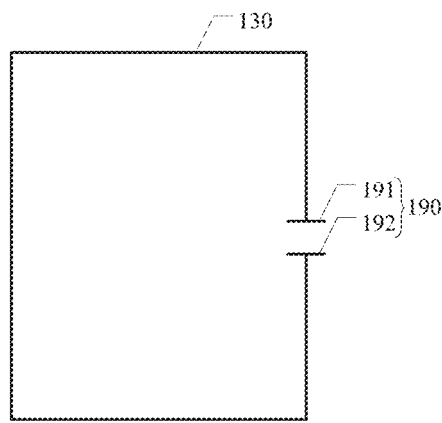
FIG. 4 is a schematic diagram of a lead and a capacitor in a backlight module provided by an embodiment of the present disclosure.

The present embodiment provides a backlight module. As illustrated by FIG. 3, a backlight module 100 includes a light emitting surface 150. The light emitting surface 150 is a surface from which backlight of the backlight module 100 (as indicated by an arrow in the diagram) emits. The backlight module 100 includes a module frame 110 and at least one first conductive tip structure 120 disposed inside the module frame 110. The first conductive tip structure 120 includes a first conductive tip 125, the first conductive tip 125 being in an exposed state of being exposed out from the module frame 110. It should be noted that, the above-described "inside the module frame 110" refers to inside a frame body of the module frame 110, other than on an inner side of the module frame 110 for placing a liquid crystal cell; and the above-described "exposed state of being exposed out from the module frame 110" refers to that the first conductive tip 125 is not covered by a material of the module frame 110, for example, it is aligned with a surface of the module frame 110, located below the surface but exposed through a hole inside the module frame, or extending out of the surface of the module frame.

For example, the inner side of the module frame 110 may further be provided with a reflecting sheet, a light guide plate, an optical film, and the like (not shown). A light emitting surface side of the backlight module 100 is also a light emitting surface side of the light guide plate. Backlight emitted from the light guide plate (as indicated by an arrow in FIG. 3) may be provided to the liquid crystal cell disposed on the inner side of the module frame 110 as a light source.

For example, a material of the module frame 110 include an organic material or an inorganic material which is insulating; and a material of the first conductive tip structure 120 may include a metal.

For example, in order to improve ability of the first conductive tip 125 to attract a charge, a material of the first conductive tip 125 may include a low-impedance metal, for example, silver or copper.

In the backlight module provided by this embodiment, since the backlight module 100 includes the first conductive tip structure 120 having the first conductive tip 125, according to a point discharge principle, static electricity or a charge released by an electro-static gun may be preferentially attracted by the first conductive tip 125, and released by the first conductive tip structure 120. Thus, by the backlight module 100 provided by this embodiment, a novel antistatic backlight module may be provided. In addition, upon a liquid crystal cell composed of an array substrate, an opposed substrate, and a liquid crystal layer sandwiched between the array substrate and the opposed substrate being disposed at an inner side of the module frame 110 of the backlight module 100 provided by the present embodiment, the backlight module 100 can avoid the static electricity or the charge released by the electro-static gun from entering into an internal circuit of the liquid crystal cell, so as to achieve an effect of protecting the liquid crystal cell. In addition, by providing a plurality of first conductive tip structures 120 in different positions of the module frame 110, ability of the backlight module 100 to attract the static electricity or the charge released by the electro-static gun may be improved.

For example, in the backlight module provided by an example of this embodiment, as shown in FIG. 3, the backlight module 100 further includes a first lead 130, the first lead 130 being disposed inside the module frame 110 and connected with the first conductive tip structure 120.

For example, as shown in FIG. 3, the first lead 130 is connected with a lower portion of the first conductive tip structure 120.

It should be noted that, the first lead 130 connected with the first conductive tip structure 120 may further release the static electricity or the charge released by the electro-static gun attracted by the first conductive tip 125, so that the backlight module provided by the present embodiment may have a stronger antistatic ability.

For example, as shown in FIG. 3, the first lead 130 is a closed lead that surrounds the module frame 110 for one circle. Of course, the first lead 130 may also not be closed, which will not be limited in the present disclosure here.

For example, in the backlight module provided by an example of the present embodiment, in order to quickly lead out the static electricity or the charge released by the electro-static gun, the first lead may be grounded. For example, the first lead may be connected with a ground lead of an apparatus to which the backlight module is mounted, so as to implement grounding of the first lead.

For example, in the backlight module provided by an example of the present embodiment, the first lead may be partially exposed out from the module frame, so that it is possible to release the static electricity or the charge released by the electro-static gun by contacting with the air.

For example, in the backlight module provided by an example of the present embodiment, the first lead may be connected with a capacitor, so as to store the static electricity or the charge released by the electro-static gun attracted by the first conductive tip in the capacitor, and to further improve the antistatic ability of the backlight module disposed by this embodiment.

For example, the capacitor includes a first electrode and a second electrode, one end of the first lead is connected with the first electrode, and the other end thereof is connected with the second electrode. One end of the first lead may be connected with one electrode of the capacitor and the other end of the first lead may be connected with the other electrode of the capacitor.

It should be noted that, the above-described various arrangements regarding to the first lead may be configured or combined according to the static electricity confronted by the backlight module in an actual application environment or an amount of the charge released by the electro-static gun, so as to implement optimization of costs and the antistatic ability of the backlight module.

Figure 5:
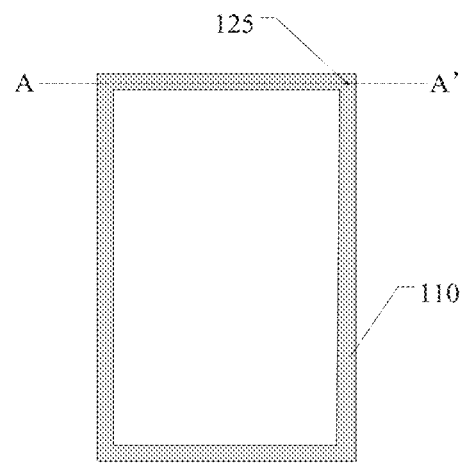
FIG. 5 is a plan schematic diagram of a backlight module provided by an embodiment of the present disclosure.

For example, in the backlight module provided by an example of the present embodiment, as shown in FIG. 3 and FIG. 5, the module frame 110 is an intermediate hollow rectangular frame, and in order to more effectively attract the static electricity or the charge released by the electro-static gun from a corner of the module frame 110, the first conductive tip structure 120 may be disposed at the corner of the module frame 110. For example, in order that the display panel including the backlight module provided by this embodiment can safely pass an antistatic performance test of the electro-static gun performed on an upper right corner of the display panel, the first conductive tip structure 120 may be disposed at the upper right corner of the module frame 110, so that it is possible to preferentially attract the charge released by the electro-static gun, and so that the display panel can safely pass the antistatic performance test of the electro-static gun. It should be noted that, the corner of the module frame has a greater space than other positions, which is more conducive to disposing the first conductive tip structure 120.

It should be noted that, in the backlight module provided by this embodiment, the module frame may further be other polygonal frame, for example, a pentagonal frame, a hexagonal frame, an octagonal frame, and the like. Of course, the module frame may also be a circular frame, which will not be limited in the present disclosure here.

Figure 6:
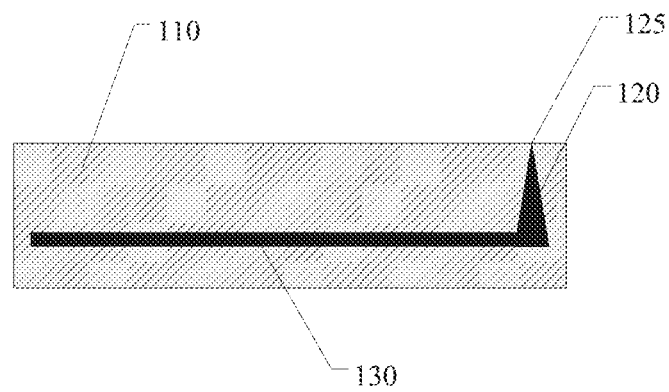
FIG. 6 is a cross-sectional schematic diagram of a backlight module provided by an embodiment of the present disclosure in a direction of A-A' in FIG. 5.

For example, in the backlight module disposed by an example of this embodiment, as shown in FIG. 3 and FIG. 6, the first conductive tip 125 and a surface of the module frame 110 close to the first conductive tip 125 are located on a same plane.

It should be noted that, since the first conductive tip 125 and the surface of the module frame 110 close to the first conductive tip 125 are located on the same plane, compared with a case where the first conductive tip 125 is disposed below the surface of the module frame 110, the first conductive tip 125 may be closer to a source of the static electricity or a position where the electro-static gun releases the charge, so that it is possible to improve the ability of the first conductive tip 125 to attract the charge, without causing any problem to installation and application of the backlight module 100. Of course, the first conductive tip and the surface of the module frame 110 close to the first conductive tip 125 may also not be located on the same plane, which will not be limited in the present disclosure here.

For example, in the backlight module provided by an example of the present embodiment, in order to more effectively attract the static electricity or the charge released by the electro-static gun from the light emitting surface 150 of the backlight module 100, as shown in FIG. 3 and FIG. 6, the first conductive tip 125 of the first conductive tip structure 120 may be disposed oriented to the light emitting surface 150.

It should be noted that, in order to more effectively attract the static electricity or the charge released by the electro-static gun from other positions, the first conductive tip 125 of the first conductive tip structure 120 may be pointedly disposed oriented to the other positions according to actual needs.

Second Embodiment

Figure 7:
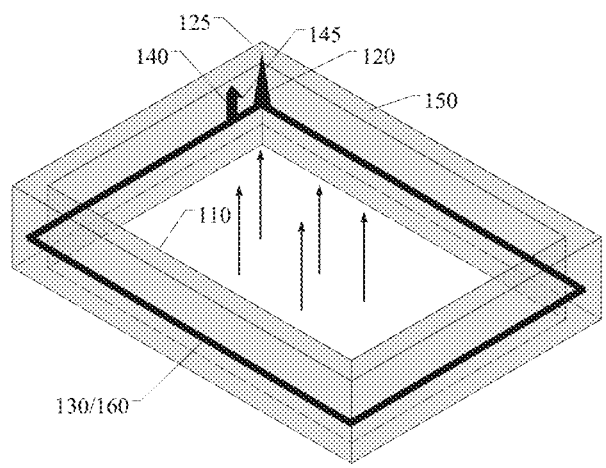
FIG. 7 is a tridimensional schematic diagram of another backlight module provided by an embodiment of the present disclosure.

The present embodiment provides a backlight module, which differs from the backlight module according to the first embodiment in that, as shown in FIG. 7, the backlight module 100 further includes a second conductive tip structure 140, which is disposed in a position inside the module frame 110 close to the first conductive tip structure 120. The second conductive tip structure 140 includes a second conductive tip 145, the second conductive tip 145 is in an exposed state of being exposed out from the module frame 110. It should be noted that, the above-described "inside the module frame 110" refers to inside a frame body of the module frame 110, other than on an inner side of the module frame 110 for placing a liquid crystal cell; and the above-described "an exposed state of being exposed out from the module frame 110" refers to that the second conductive tip 145 is not covered by a material of the module frame 110, for example, it is aligned with a surface of the module frame 110, located below the surface but exposed through a hole inside the module frame, or extending out of the surface of the module frame.

It should be noted that, since the second conductive tip structure 140 also has the second conductive tip 145 which can attract static electricity or a charge released by the electro-static gun, the second conductive tip structure 140 may further improve an antistatic ability of the backlight module.

Figure 8:
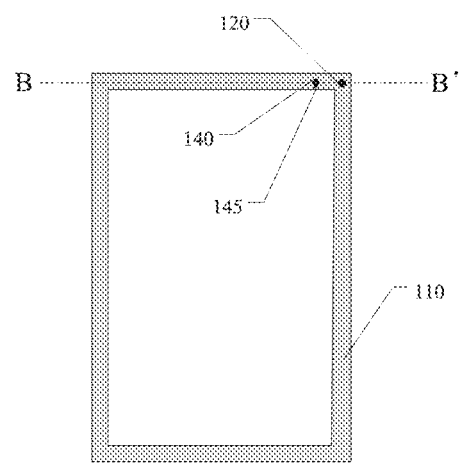
FIG. 8 is a plan schematic diagram of another backlight module provided by an embodiment of the present disclosure.

For example, in the backlight module disposed by an example of this embodiment, as shown in FIG. 7 and FIG. 8, the second conductive tip 145 of the second conductive tip structure 140 is disposed oriented to an inner side of the module frame 110. It should be noted that, the above-described inner side of the module frame refers to a position in the module frame for placing the liquid crystal cell.

It should be noted that, in a case where the backlight module provided by the present embodiment and the liquid crystal cell including the array substrate shown in FIG. 1a are combined to form a display panel, the second conductive tip structure may be disposed close to a fracture of a test line corner portion and the second conductive tip is disposed oriented to the fracture of the test line corner portion. Therefore, even if there is still part of the static electricity or the charge released by the electro-static gun entering into the test line corner portion, the second conductive tip can attract the static electricity or the charge released by the electro-static gun entering into the test line corner portion, and release the same through a second conductive tip device, so as to perform secondary protection on the liquid crystal cell including the array substrate shown in FIG. 1a.

For example, in the backlight module provided by an example of the present embodiment, as shown in FIG. 8, the second conductive tip 145 and a surface of the module frame 110 close to the second conductive tip 145 (e.g., an inner side of the module frame 110) are located on a same plane.

It should be noted that, since the second conductive tip 145 and the surface of the module frame 110 close to the second conductive tip 145 are located on the same plane, relative to a case where the second conductive tip 145 is disposed below the surface of the module frame 110, the second conductive tip 145 may be closer to a source of the static electricity or a position where the electro-static gun releases the charge, so that it is possible to improve the ability of the second conductive tip 145 to attract the charge, without causing any problem to installation and application of the backlight module 100. Of course, the second conductive tip and the surface of the module frame 110 close to the second conductive tip may also not be located on the same plane, which will not be limited in the present disclosure here.

For example, the backlight module provided by an example of this embodiment may further include a second lead, and the second conductive tip structure may be connected with the second lead.

Figure 9:
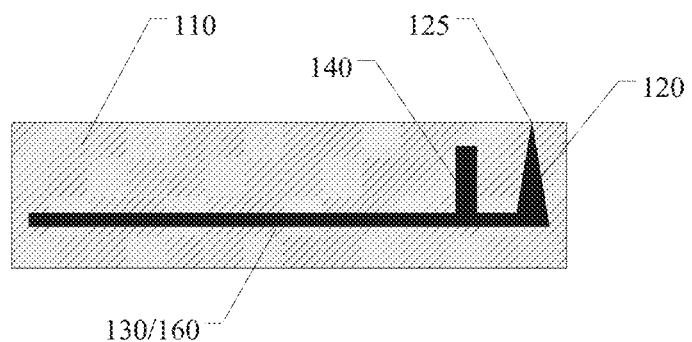
FIG. 9 is a cross-sectional schematic diagram of another backlight module provided by an embodiment of the present disclosure in a direction of B-B' in FIG. 8.

For example, as shown in FIG. 9, the second lead 160 and the first lead 130 may belong to a same lead. Of course, the first lead and second lead may also be different leads, which will not be limited in the present disclosure here.

It should be noted that, the second lead 160 connected with the second conductive tip structure 140 may further release the static electricity or the charge released by the electro-static gun attracted by the second conductive tip 145, so that the backlight module provided by the present embodiment may have a stronger antistatic ability. It should be noted that, the second lead may also use various arrangements with respect to the first lead according to the first embodiment, and may be configured or combined according to the static electricity confronted by the backlight module in an actual application environment or an amount of the charge released by the electro-static gun, so as to implement optimization of costs and the antistatic ability of the backlight module.

Third Embodiment

The present embodiment provides a display panel, including any one of the backlight modules according to the above-described first embodiment.

In the display panel provided by this embodiment, since the display panel has any one of the above-described backlight modules, the display panel has a technical effect of a corresponding backlight module.

Figure 10:
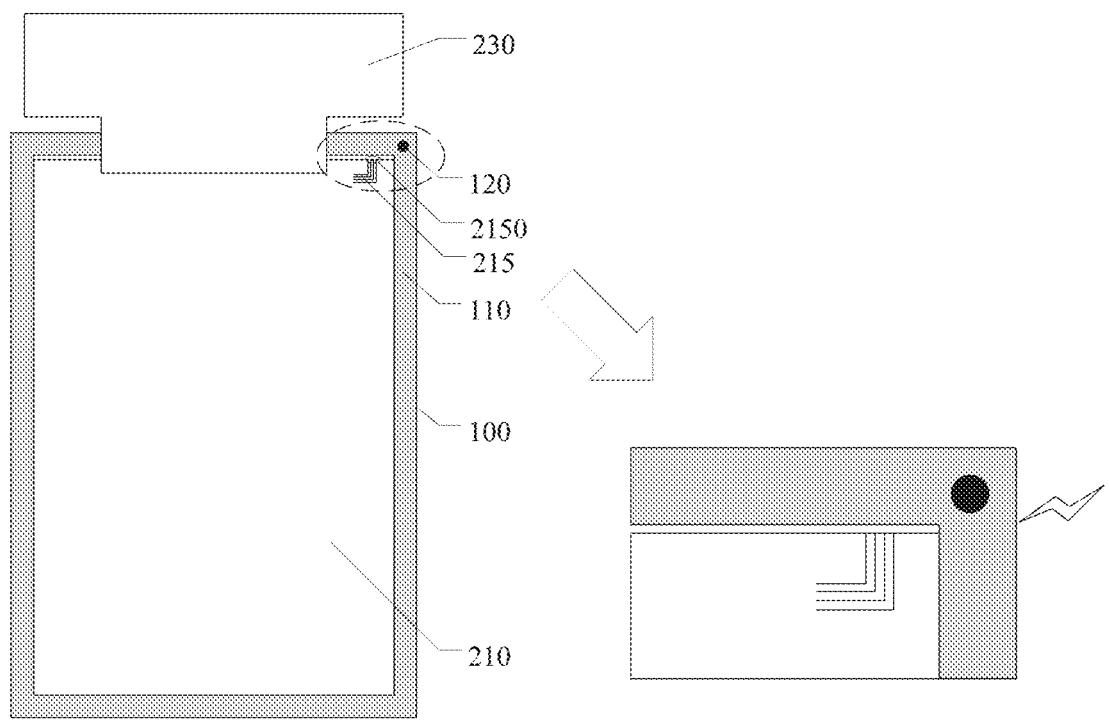
FIG. 10 is a plan schematic diagram of a display device provided by an embodiment of the present disclosure.

For example, in the display panel provided by an example of this embodiment, as shown in FIG. 10, the display panel includes a backlight module 100, which includes a module frame 110, an array substrate 210 disposed on an inner side of the module frame 110, and a flexible printed circuit board 230 connected with the array substrate 210. The array substrate 210 includes a conductive line 215, the conductive line 215 having a fracture 2150 at an edge of the array substrate. A first conductive tip structure 120 is disposed in a position inside the module frame 110 and close to the fracture 2150 of the conductive line 215.

For example, as shown in FIG. 10, the conductive line 215 has a fracture 2150 at an upper right edge of the array substrate 210; and the first conductive tip structure 120 is disposed at an upper right corner of the module frame 110.

In the display panel provided by the present embodiment, since the display panel includes the first conductive tip structure 120 disposed at the position inside the module frame 110 and close to the fracture 2150 of the conductive line 215, according to a point discharge principle, static electricity or a charge released by an electro-static gun may be preferentially attracted by the first conductive tip 125 of the first conductive tip structure 120, and released through the first conductive tip structure 120. Thus, the display panel provided by this embodiment can avoid the static electricity or the charge released by the electro-static gun from entering into the internal circuit of the display panel, so as to achieve an effect of protecting the display panel.

Figure 11:
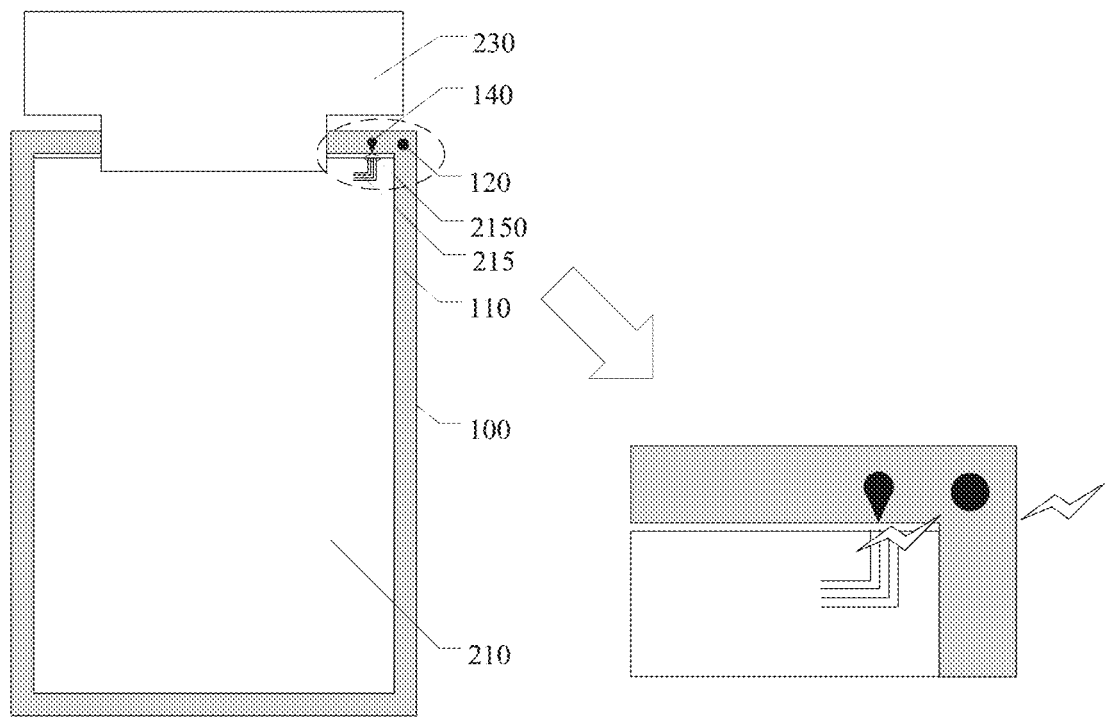
FIG. 11 is a plan schematic diagram of another display device provided by an embodiment of the present disclosure.

For example, in the display panel provided by an example of this embodiment, as shown in FIG. 11, the display panel further includes a second conductive tip structure 140, which is disposed in a position inside the module frame 110 and close to the first conductive tip structure 120, the second conductive tip structure 140 including a second conductive tip 145, the second conductive tip 145 being in an exposed state of being exposed out from the module frame 110.

It should be noted that, since the second conductive tip structure 140 also has the second conductive tip 145 which can attract the charge, the second conductive tip structure 140 may further improve an antistatic ability of the display panel. Likewise, the display panel may further include a second lead disposed inside the module frame, the second conductive tip structure being connectable with the second lead. In addition, the second lead and the first lead may belong to a same lead. Of course, the first lead and second lead may also be different leads, which will not be limited in the present disclosure here.

For example, in the display panel provided by an example of this embodiment, as shown in FIG. 11, the second conductive tip 145 is disposed oriented to the fracture 2150 of the conductive line 215.

In the display panel provided by this embodiment, even if there is still part of the charge entering into the conductive line 215, the second conductive tip 145 can attract the static electricity or the charge released by the electro-static gun entering into the conductive line 215, and release the same through a second conductive tip device 140, so as to perform secondary protection on the display panel.

For example, in the display panel provided by an example of this embodiment, as shown in FIG. 11, the second conductive tip 145 and the surface of the module frame 110 close to the second conductive tip 145 are located on a same plane.

It should be noted that, since the second conductive tip 145 and the surface of the module frame 110 close to the second conductive tip 145 are located on the same plane, relative to a case where it is disposed below the surface of the module frame 110, the second conductive tip 145 may be closer to a source of the static electricity or a position where the electro-static gun releases the charge, so that it is possible to improve the ability of the second conductive tip 145 to attract the charge. Of course, the second conductive tip and the surface of the module frame 110 close to the second conductive tip may also not be located on the same plane, which will not be limited in the present disclosure here.

For example, in the display panel provided by an example of this embodiment, as shown in FIG. 11, the conductive line may include a cut test line 215. For example, the test line 215 is electrically connected with an array element or other component on the array substrate 210; and after completion of preparation of the array element, its performance may be detected by the test line 215.

Figure 12:
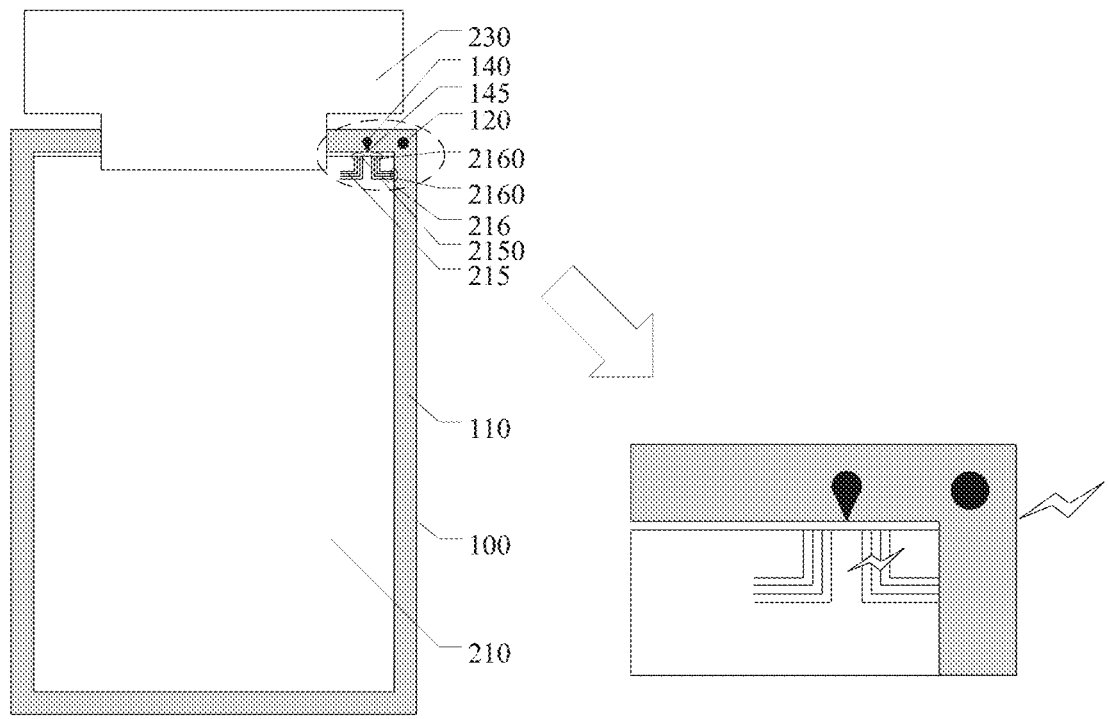
FIG. 12 is a plan schematic diagram of another display device provided by an embodiment of the present disclosure.

For example, in the display panel provided by an example of this embodiment, as shown in FIG. 12, the display panel may include the array substrate 210 as shown in FIG. 1a, and the second conductive tip 145 is disposed oriented to a fracture 2160 of the test line corner portion 216. Thus, even if there is still part of the static electricity or the charge released by the electro-static gun entering into the test line corner portion 216, the second conductive tip 145 can attract the static electricity or the charge released by the electro-static gun entering into the test line corner portion 216, and release the same through the second conductive tip device 140, so as to perform secondary protection on the display panel including the array substrate 210 as shown in FIG. 1a.

Fourth Embodiment

This embodiment provides a display device, including any one of the display panels according to Embodiment Three.

In the display device provided by this embodiment, since the display device has an antistatic display panel, it is possible to avoid static electricity or a charge released by an electro-static gun from entering into an internal circuit of the display panel, to prevent occurrence of electro-static discharge (ESD), so that it is possible to protect the internal circuit of the display panel, and further reduce display abnormality.

The above merely is specific embodiments of the present disclosure, and not intended to define the scope of the present disclosure. Any variations or replacements which can be easily thought of by those skilled in the art in the scope of the present disclosure all shall fall within the scope of protection of the present disclosure. Therefore, the scope of the present disclosure should be the scope of the following claims.

The present application claims priority of Chinese Patent Application No. 201620307448.2 filed on Apr. 13, 2016, the present disclosure of which is incorporated herein by reference in its entirety as part of the present application.

The invention claimed is:

1. A backlight module, having a light emitting surface, wherein the backlight module comprises:
    a module frame; and
    at least one first conductive tip structure, disposed inside the module frame, the first conductive tip structure including a first conductive tip, the first conductive tip being in an exposed state of being exposed out from the module frame,
    wherein the first conductive tip and a surface of the module frame close to the first conductive tip are located on a same plane, and wherein the first conductive tip is a tip of the first conductive tip structure.

2. The backlight module according to claim 1, wherein, the module frame is a polygonal frame, and the first conductive tip structure is disposed at a corner of the module frame.

3. The backlight module according to claim 1, wherein, the first conductive tip of the first conductive tip structure is disposed oriented to the light emitting surface.

4. The backlight module according to claim 1, further comprising: a first lead, the first lead being disposed inside the module frame and connected with the first conductive tip structure at a position opposite to the first conductive tip.

5. The backlight module according to claim 4, wherein, the first lead is grounded.

6. The backlight module according to claim 4, wherein, the first lead is partially exposed out from the module frame.

7. The backlight module according to claim 4, wherein, the first lead is a closed lead that surrounds the module frame for one circle.

8. The backlight module according to claim 4, wherein, the first lead is connected with a capacitor.

9. The backlight module according to claim 1, further comprising: a second conductive tip structure, the second conductive tip structure being disposed in a position inside the module frame close to the first conductive tip structure, the second conductive tip structure including a second conductive tip, the second conductive tip being in an exposed state of being exposed out from the module frame.

10. The backlight module according to claim 9, wherein, the second conductive tip of the second conductive tip structure is disposed oriented to an inner side of the module frame.

11. The backlight module according to claim 9, wherein, the second conductive tip and a surface of the module frame close to the second conductive tip are located on a same plane.

12. The backlight module according to claim 9, further comprising: a second lead, the second lead being disposed inside the module frame and connected with the second conductive tip structure.

13. The backlight module according to claim 12, further comprising: a first lead, the first lead being disposed inside the module frame and connected with the first conductive tip structure, and the first lead and the second lead belonging to a same lead.

14. A display panel, comprising the backlight module according to claim 1.

15. The display panel according to claim 14, further comprising an array substrate, the array substrate including a conductive line and being disposed on an inner side of the module frame, the conductive line having a fracture at an edge of the array substrate, and the first conductive tip structure being disposed in a position inside the module frame and close to the fracture of the conductive line.

16. The display panel according to claim 15, wherein, the backlight module further comprises a second conductive tip structure, the second conductive tip structure being disposed in a position inside the module frame and close to the first conductive tip structure, the second conductive tip structure including a second conductive tip, the second conductive tip being in an exposed state of being exposed out from the module frame.

17. The display panel according to claim 16, wherein, the second conductive tip is disposed oriented to the fracture of the conductive line.

18. The display panel according to claim 15, wherein, the conductive line includes a cut test line.

19. A display device, comprising the display panel according to claim 14.

* * * * *